000
United States Patent [19]

Nagasuna et al.

[11] Patent Number: 4,973,632

[45] Date of Patent: Nov. 27, 1990

[54] PRODUCTION PROCESS FOR WATER-ABSORBENT RESIN

[75] Inventors: Kinya Nagasuna, Hyogo; Takashi Namba; Koji Miyake, both of Osaka; Kazumasa Kimura, Nara; Tadao Shimomura, Osaka, all of Japan

[73] Assignee: Nippon Shokubai Kagaku Kogyo Co., Ltd., Osaka, Japan

[21] Appl. No.: 371,174

[22] Filed: Jun. 26, 1989

[30] Foreign Application Priority Data

Jun. 28, 1988 [JP] Japan ............................. 63-158086
Oct. 13, 1988 [JP] Japan ............................. 63-255866

[51] Int. Cl.$^5$ .................... C08F 2/08; C08F 20/06; C08F 120/06
[52] U.S. Cl. .................... 526/200; 526/213; 526/317.1; 526/318.1
[58] Field of Search .................... 526/200, 213, 318.1, 526/317.1

[56] References Cited

U.S. PATENT DOCUMENTS 4,683,274 7/1987 Nakamura et al. ............... 526/200

FOREIGN PATENT DOCUMENTS 43606A 8/1984 Japan ............................ 526/200

Primary Examiner—Joseph L. Schofer
Assistant Examiner—Tom Weber
Attorney, Agent, or Firm—Armstrong, Nikaido, Marmelstein, Kubovcik & Murray

[57] ABSTRACT

This invention relates to a water-absorbent resin of a new, novel type obtained from polymerization of water-soluble ethylenically unsaturated monomer and a process for producing this resin.

The water-absorbent resin in this invention has average particle diameter in a specially defined range and a narrow range of particle distribution, being superior in water-absorption capacity, and also, being superior in handling properties in a point of that, when being mixed with liquid, formation of a fish-eye is absent. The water-absorbent resin shows an angle-lacking, non-sphere shape and, in a case of shape like this, is superior in handling properties in a point that being hard in falling off from an basis material.

Although the production process is performed to get a water-absorbent resin by carrying out polymerization in a reverse-phase suspension polymerization method, since the aqueous monomer solution is chosen from a specially defined viscosity range and dispersed and suspended by using a specially defined dispersing agent, a water-absorbent resin is easily obtainable wherein, not only the average particle diameter is controlled by adjusting the viscosity of an aqueous monomer solution, but also the particle diameter distribution is narrow. The water-absorbent resin obtained shows that a water-soluble component is small, so that it is very good for sanitary reasons. In this method, it is possible to vary the particle shape by changing up and down the viscosity of an aqueous monomer solution in an above-described specially defined range.

The water-absorbent resin in this invention, because of having the above-described properties, is preferably used for sanitary materials and the like.

3 Claims, 2 Drawing Sheets

PRODUCTION PROCESS FOR WATER-ABSORBENT RESIN

BACKGROUND OF THE INVENTION

This invention relates to a water-absorbent resin of a new, novel type obtained from polymerization of water-soluble ethylenically unsaturated monomer and a process for producing this resin. In detail, it relates to a water-absorbent resin having average particle diameter in a specially defined range and a narrow range of particle distribution, being superior in water absorption capacity, water absorption rate, and suction force, showing that an amount of elution of water-soluble resin (hereinafter referred to as, water-soluble component) is only small, and being very suitable as sanitary materials, and a water-absorbent resin wherein the shape is not sphere angle-absent and also, being superior in handling and treating, and besides, a process for producing the water-absorbent resins by reverse-phase suspension polymerization under specified conditions.

Hitherto, an attempt has been carried out to use a water-absorbent resin as an absorbent sanitary material for absorbing body fluids such as a sanitary cotton, a disposable diaper, and the like. There have been known, as water-absorbent resins for this purpose, a hydrolyzed starch-acrylonitrile graft polymer (Japanese Official Patent Gazette, shouwa 49-43395), a neutralized starch-acrylic acid graft polymer (Japanese Official Patent Provisional Publication, shouwa 51-125468), a saponified vinyl acetate-acrylic acid ester copolymer (Japanese Official Patent Provisional Publication, shouwa 52-14689), a hydrolyzed acrylonitrile or acrylamide copolymer (Japanese Official Patent Gazette, Shouwa 53-15959), and crosslinked products of these polymers, a crosslinked product of a partially neutralized polyacrylic acid (Japanese Official Patent Provisional Publication, Shouwa 55-84304) and others.

As methods to produce a water-absorbent resin from a water-soluble ethylenically unsaturated monomer, although aqueous solution polymerization etc. are hitherto known in addition to the reverse-phase suspension polymerization wherein a monomer or its aqueous solution is suspended and polymerized, properties such as shape of resins obtained from these polymerization methods is almost settled depending on the respective process, some serious problems have been found in points of shape, handling properties, and safety etc. for water-absorbent resins obtained from previous polymerization methods. For instance, in a case of that a water-absorbent resin is produced by aqueous solution polymerization, since a powdering process is usually required after polymerization, the resin obtained is irregular, cracked particles having sharp angles and its particle distribution generally broad, so that a countermeasure for dust is necessary. Further, when reverse-phase suspension polymerization is performed, a resin obtained is of sphere or granular-type resulting from condensation of the round shape resin.

In this reverse-phase suspension polymerization process, a monomer or its aqueous solution is dispersed in a stable form in a hydrophobic organic solvent and polymerized, usually requiring a dispersing agent, so that this agent has a great influence on the decision of particle diameter and handling properties of water-absorbent resins obtained. As a dispersing agent being hitherto used in reverse-phase suspension polymerization, there have been known, for examples, nonionic surface active agents such as sorbitan fatty acid esters (Japanese Official Patent Gazette, shouwa 54-30710), glycerol or polyglycerol fatty acid esters (Japanese Official Patent Provisional Publication, shouwa 62-172006), sucrose fatty acid esters (Japanese Official Patent Provisional Publication, shouwa 57-167302) etc., cellulose derivatives such as cellulose ethers and cellulose esters (Japanese Official Patent Provisional Publication, shouwa 58-32607), and oleophilic polymers having carboxyl groups (Japanese Official Patent Provisional Publication, shouwa 57-21405). Among these, when the nonionic surface active agents are used, a polymer obtained has such a small mean particle diameter as below 100 $\mu$m and the particle distribution becomes very broad, so that it is not enough in water absorption capacity and requires a countermeasure for dust when it handles in a powder condition, and accompanies formation of a large amount of an extraneous matter on the side wall of reaction vessels during polymerization. Also, a water-absorbent resin obtained has a small diameter and broad range of particle distribution, therfore, if a treatment solution is mixed to that with an improvement purpose, the mixing becomes ununiform and often, the improvement can not be performed uniformly. When the mixing becomes ununiform, a polymer powder makes in part a lump, which is hereinafter referred to as a fish-eye. When cellulose derivatives such as cellulose ethers and cellulose esters are used, the average particle diameter becomes large as about 100 ~200 $\mu$m, but there exists such weak points that these dispersing agents show in general low solubility for hydrophobic organic solvents, easily crystalize out at room temperature, are mixed in the finished product as a block form, and those once mixed in the finished product are again melted during drying and fuse together with the finished product. Further, when a oleophilic polymer having carboxy groups is used, there remains the dispersing agent on the surface of forming water-absorbent resin, so that the product is not safe enough in a case being employed as sanitary materials.

Besides, to obtain an improved water-absorbent resin being superior in electrolyte absorption capacity, having large particle diameter, and taking a rustling particle shape, there has been reported a method wherein to an aqueous solution of unsaturated monomer is added hydroxyethylcellulose and, by using a sorbitan fatty acid ester as a dispersing agent, reverse-phase suspension polymerization is performed (Japanese Official Patent Provisional Publication, shouwa 56-76419).

Thus, water-absorbent resins hitherto obtained from either aqueous solution polymerization or reverse-phase suspension polymerization all have had problems in points of shape, handling properties, and safety, as described above.

Also resin shape of this kind much affects the employing manner of resin. In general, a water-absorbent resin is frequently used in combination with other materials having absorption properties. For instance, in a case of that a water-absorbent resin is used as a water-absorbent agent in an absorbent body of sanitary materials such as a paper diaper or a sanitary cotton etc., there has been adapted a method wherein the water-absorbent resin being laminated among absorbent papers, being dispersed in a sandwich style among cotton-like pulps, or being blended with cotton-like pulps. If, in these cases is employed a water-absorbent resin of irregular and cracked shape, obtained by the above-described aqueous solution polymerization, having sharp angles and broad distribution of particles, there occurs a problem that an angle of resin having a large particle diameter tears a paper and therefrom, particles fall off or the resin is pressed out during swelling, for instance, in a case of that the resin is laminated among water absorption papers. Also, since a water-absorbent resin obtained from reverse-phase suspension polymerization is generally small in average particle diameter and of round shape, there occurs a problem in dispersion etc. when being laminated among the absorption papers, being dispersed in a sandwich style among cotton-like papers, or being blended with cotton-like pulps and, after distribution, there occurs also a problem that the resin very easily moves and drops out just before and after use of an absorbing body.

As described above, the resins being widely used at the present age are not enough suitable in size, particle distribution, and shape and, therfore, not sufficiently satisfactory in all of such points as water-absorbent capacity, handling and treating, properties for use and others.

BRIEF SUMMARY OF THE INVENTION

Under these circumstances, the first object of this invention is to provide a water-absorbent resin, wherein the average particle diameter being in a specially defined range, the particle distribution being narrow, and therefore, the water absorption capacity being great, the water absorption rate being high, the suction force being great and also, the properties for use being superior like that dissolution of a water-soluble component from the surface of water-absorbent resin is small in amount and, as a result, being very suitable as sanitary materials and the like, and also, to provide a production process for the resin.

The second object of the present invention is to provide a water-absorbent resin, having a shape of non-sphere without any angle and being superior in treating and handling properties, and to provide a production process for the resin.

The present inventors, as a result of an extensive study carried out to attain the above-described objects, have completed the present invention by finding that, in a reaction of reverse-phase suspension polymerization, if an aqueous solution of water-soluble ethylenically unsaturated monomer is chosen from a range of a specially defined viscosity and, in addition, if a specific nonionic surface active agent is used as a dispersing agent, a very satisfactory result is obtained.

In a production process of a water-absorbent resin wherein an aqueous solution of water-soluble ethylenically unsaturated monomer being suspended in an inert hydrophobic organic solvent and reverse-phase suspension polymerization being performed with a radical polymerization initiator, the present invention relating to a production process of a water-absorbent resin is specialized by that, an aqueous solution of water-soluble ethylenically unsaturated monomer, of which viscosity is 15 cps or more as determined by a Brookfield rotation viscometer (25° C., 0.6 rpm), is chosen as an aqueous solution of the monomer and, in addition, a sucrose fatty acid esters and/or a polyglycerol fatty acid esters are used as a dispersing agent.

If being carried out like this, is obtained a waterabsorbent resin having an average diameter in a specially defined range and narrow particle distribution and showing that elution of a water-soluble component is small in amount.

In perfoming the above-described production process, if the viscosity defined as above is adjusted in a range of 15~5,000 cps, is obtained a sphere water-absorbent resin having an average diameter of 100~600 μm and an index (a logarithmic standard deviation) of 0.35 or less which represents particle diameter distribution.

Furthermore, in performing the above-described production process, if the viscosity defined as above is adjusted in a range of 5,000~1,000,000 cps and, as a dispersing agent, a sucrose fatty acid esters is only used, is obtained a water-absorbent resin wherein the ratio between length and breadth being in a range of 1.5~20 and the shape being non-sphere without angle.

As examples of a water-soluble ethylenically unsaturated monomer constituting a water-absorbent resin in the present invention, are cited monomers of anionic character such as acrylic acid, methacrylic acid, crotonic acid, maleic acid and its anhydride, fumaric acid, itaconic acid, and 2-(meth)acryloylethanesulfonic acid, and 2-(meth)acryloylpropanesulfonic acid, and 2-(meth)acrylamido-2-methylpropanesulfonic acid, vinylsulfonic acid, styrenesulfonic acid and the like and their salts; monomers containing nonionic hydrophilic substituent such as (meth)acrylamide, N-substituted (meth)acrylamides, 2-hydroxyethyl (meth)acrylate, 2-hydroxypropyl (meth) acrylate, methoxypolyethylene glycol (meth)acrylate, polyethylene glycol (meth)acrylate and the like; monomers of cationic character such as N,N'-dimethylaminoethyl (meth)acrylate, N,N'-diethylaminoethyl (meth)acrylate, N,N'-diethylaminopropyl (meth)acrylate, N,N'-dimethylaminopropyl (meth)acrylamide, and the like and their quaternary salts. These compounds can be used as alone or mixture of two or more compounds. Preferable are a kind of compound or a mixture of two or more compounds chosen from the following three groups of compounds: (meth)acrylic acid, 2-(meth)acryloylethanesulfonic acid, 2-(meth) acrylamido-2-methylpropanesulfonic acid, and their salts; and N,N'-dimethylaminoethyl (meth)acrylate and their quaternary salts; and methoxypolyethylene glycol (meth)acrylate and (meth)acrylamide. Although the monomer concentration in an aqueous monomer solution is generally variable in a wide range, the preferred range is from 20 weight % up to saturation.

The water-absorbent resin relating to the present invention comprises a self-crosslinking type prepared in absent of a crosslinking agent and a type co-polymerized during polymerization with a small amount of crosslinking agent, which has polymerizable unsaturated groups or reactive functional groups. As examples of the crosslinking agents are cited N,N'-methylenebis(meth)acrylamide, N-methylol(meth)acrylamide, ethylene glycol (meth)acrylate, polyethylene glycol (meth)acrylate, propylene glycol (meth)acrylate, polypropylene glycol (meth)acrylate, glycerol tri(meth)acrylate, glycerol mono(meth)acrylate, polyfunctional metal salts of (meth) acrylic acid, trimethylolpropane tri(meth)acrylate, triallylamine, triallyl cyanulate, triallyl isocyanulate, triallyl phosphate, glycidyl (meth)acrylate. As examples of agents having reactive functional groups for example, in a case that a monomer has a carboxyl and/or carboxylate group, polyhydric alcohol derivatives such as ethylene glycol, diethylene glycol, triethylene glycol, tetraethylene glycol, polyethylene glycol, glycerol, polyglycerol, propylene glycol, diethanolamine, triethanolamine, polyoxypropylene, oxyethyleneoxypropylene block co-polymer, pentaerythritol, and sorbitol; polyglycidyl derivatives such as ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, and polypropylene glycol diglycidyl ether; aziridine derivatives and related compounds such as 2,2-bishydroxymethylbutanol-tris [3-(1-aziridinyl) propionate], 1,6-hexamethylene-diethylene urea, and diphenylmethane-bis-4,4'-N,N'-diethylene urea; haloepoxyl compounds such as epichlorohydrin and α-methylchlorohydrin; polyaldehydes such as glutar aldehyde and glyoxal; poly amine derivatives such as ethylene diamine, diethylene triamine, triethylene tetramine, tetraethylene pentamine, pentaethylene hexamine, and polyethylene hexamine; polyisocyanates such as 2,4-toluylenediisocyanate and hexamethylenediisocyanate; polyvalent metal salts such as aluminium chloride, magnesium chloride, calcium chloride, aluminium sulfate, magnesium sulfate, and calcium sulfate. Subject to consideration upon reactivity, these crosslinking agents can be used as a mixture of more than two, but it is usually preferable to use a crosslinking agent having polymerizable unsaturated groups. An amount of use of these agents is in general about 0.001~1.0 mol. for a water-soluble ethylenically unsaturated monomer.

In the present invention, the viscosity of an aqueous solution of water-soluble ethylenically unsaturated monomer is required to adjust at a value of 15 cps or more when determined with a Brookfield rotatory viscometer (25° C., 0.6 rpm) (this sort of viscosity is hereinafter referred to as, simply, viscosity). If the viscosity being below 15 cps, the particle obtained is small in average particle diameter and broad in distribution of particle diameter.

In a method of the present invention wherein a previously-described, specially defined dispersing agent being used, the viscosity of an aqueous solution of water-soluble ethylenically unsaturated monomer being adjusted in a range of 15~5,000 cps, a water-absorbent resin of sphere shape having a average particle diameter in a range of 100~600 μm depending upon viscosity and very narrow distribution of particle diameter can be obtained. According to the present invention, a resin of a wanted average particle diameter can be obtained with such a simple procedure as an adjustment of viscosity.

Although a preferable average particle diameter of a water-absorbent resin obtained is different depending upon a use, for instance, in a case being used as sanitary materials, the average particle diameter is usually in a range of 100~600 μm, more preferably about 150~400 μm. The particle of this kind is obtainable when the viscosity of an aqueous solution being adjusted in a range of 15~5,000 cps, more preferably 20~3,000 cps. In addition, a water-absorbent resin obtained according to this method shows very narrow distribution of particle diameter.

For instance, when particle distribution is plotted in a logarithmic probability paper, a value of logarithmic standard deviation ($\sigma_l$), which is an index showing uniformity of a particle, is below 0.35, in a more preferable case below 0.30, that is narrow particle distribution not yet obtained by any previous method.

In the other side, when the viscosity of an aqueous solution of water-soluble ethylenically unsaturated monomer is adjusted in a range of 5,000~1,000,000 cps, although dependent upon stirring condition, the particles obtained shows that the ratio between average length and average breadth for particles as defined as below-described is in a range of 1.5~20, and an angle-lacking and non-sphere, so to speak, Vienna sausage-like shape. This resin has length of 100~10000 μm, more preferably 1000~10000 μm and breadth of 10~2000 μm, more preferably 100~2000 μm, and a ratio between average length and average breadth being in a range of 1.5~20, so that it is easy in handling and treating. The diameters to represent a shape of water-absorbent resins are defined as follows.

Although being in a range of more than 5,000 cps, when the viscosity is in a range of 5,000~20,000 cps, a non-sphere resin and a sphere resin are obtained as a mixture and, when the viscosity is higher than 20,000 cps, a non-sphere resin is only obtained. Furthermore, when the viscosity is higher than 1,000,000 cps, there is sometimes accompanied by difficulty when an aqueous solution of monomer being supplied for a reaction vessel.

As the thickener used for adjsting viscosity as described above, are cited hydroxyethylcellulose, hydroxypropylcellulose, methylcellulose, carboxymethylcellulose, polyethylene glycol, polyacrylamide, polyethyleneimine, polyacrylic acid, partially neutralized polyacrylic acid, crosslinked polyacrylic acid, partially neutralized, crosslinked polyacrylic acid, dextrin, and sodium arginate so on. Preferable are hydroxyethylcellulose, polyacrylamide, polyacrylic acid, partially neutralized polyacrylic acid, crosslinked polyacrylic acid, partially neutralized, crosslinked polyacrylic acid. Very specially preferred for a water absorbent-resin having a new shape is hydroxyethylcellulose. For use of a water-soluble, partially neutralized polyacrylic acid, the viscosity of its 5% aqueous solution is preferred when it is 30 cps or more. For use of a water-insoluble, crosslinked product, is preferred the one whose particle diameter is about 30 μm or less and powder-like.

To thicken an aqueous solution to a designated viscosity by using these thickener, it is preferred that the thickener is generally used in a range of 0.05~20 weight % to a monomer, although the percentage is variable with the kind and concentration of a monomer and the kind and molecular weight of a thickener.

Dispersing agents used in the present invention are sucrose fatty acid esters and/or polyglycerol fatty acid esters. As the former sucrose fatty acid esters, are cited mono-, di-, and triesters derived from sucrose with more than one aliphatic acid chosen from stearic acid, palmitic acid, lauric acid, and oleic acid. As the latter polyglycerol fatty acid esters, are cited mono-, di-, and triesters derived from polyglycerin of condensation degree below 10 with, at least, one aliphatic acid chosen from stearic acid, palmitic acid, lauric acid, oleic acid, and ricinolic acid. Among all these nonionic surface active agents, most preferable are those indicating HLB of 2~6. The amount of a dispersing agent for use is generally 0.05~10 weight %, more preferably 0.5~5 weight % against the amount of a water-soluble ethylenically unsaturated monomer. To obtain the water-absorbent resin having a new nonsphere shape without angle, that is one object of the present invention, the sucrose fatty acid esters can be only used and, if other kinds of dispersing agents are used, this novel type of resin is not obtained.

As an inert hydrophobic organic solvent used for the present invention are cited, for example, aliphatic hydrocarbons such as n-pentane, n-hexane, n-heptane, and n-octane; cycloliphatic hydrocarbons such as cyclohexane, cyclooctane, methycyclohexane, decaline, and their derivatives; aromatic hydrocarbons such as benzene, ethylbenzene, toluene, xylene, and their substituted derivatives; and halogenated hydrocarbons such as chlorobenzene, bromobenzene, carbon tetrachloride, and 1,2-dichloroethane. These agents can be used as alone or a mixture of more than two kinds. Specially preferable are n-hexane, n-heptane, cyclohexane, methylcyclohexane, toluene, xylene, and carbon tetrachloride.

The ratio of an organic solvent to a water-soluble ethylenically unsaturated monomer is generally suitable as 1:1~5:1 from standpoints of steady dispersion and removal of heat generated during polymerization and temperature control.

As an initiator for radical polymerization in the present invention, any kind of conventional agent can be used without limitation, but particularly, water-soluble ones are preferred. More concretely, for example, persulfates such as potassium persulfate, sodium persulfate, and ammonium persulfate; hydroperoxides such as hydrogen peroxide, t-butyl hydroperoxide, and cumene hydroperoxide; azo compounds such as 2,2'-azo-bis-2-amidinopropane dihydrochloride etc. are cited. These polymerization initiators can be used as a mixture of more than two agents. Furthermore, a redox type initiator prepared by combination of these polymerization initiators and reducing agents such as sulfite, L-ascorbic acid, and ferric salts may also be used.

Although the production process of a water-absorbent resin in the present invention is not especially defined, for example, if reverse-phase suspension polymerization is used, it is carried out in such a way that an aqueous solution of ethylenically unsaturated monomer having viscosity of more than 15 cps, which is arranged as described as above, is dispersed and suspended in a polymerization-inert hydrophobic organic solvent by using an above-described, especially chosen dispersing agent and then, polymerized by a radical polymerization initiator.

Although the reason, why the water-absorbent resin having an average particle diameter in a specially defined range of the present kind and narrow distribution of particle diameters is obtained, is not necessarily clear for the inventors at present, the following two conditions are essential in a process of reverse-phase suspension polymerization of an aqueous solution of water-soluble ethylenically unsaturated monomer:(1) use of sucrose fatty acid esters and/or polyglycerol fatty acid esters as a dispersing agent; (2) adjustment of viscosity of the aqueous solution at the previously designated viscosity by using a thickner. If either one of the two conditions is lacking, the purpose of this invention is no longer attained.

A water-absorbent resin of this invention, wherein an average particle diameter being in a specially defined range and distribution of particle diameters being narrow, does not make fish-eye when absorbing water and is very superior in water-absorption rate, water-absorption capacity, suction force and liquid-permeability. Also, the water-absorbent resin of the present invention, even in a case of that being mixed with a treatment agent containing water to improve the resin surface, has advantage that, due to a feature of particle diameter and its narrow distribution, it is uniformly mixed with a treatment agent leading to an uniform improvement of the resin surface. Furthermore, the water-absorbent resin of the present invention having a new, angle-lacking, and stick-like shape quite different from previous ones is very superior in handling properties from point of that its falling off from a basic material takes place very rarely and so on. This water-absorbent resin of new shape, due to a feature of this shape, shows increase in a combination range with other materials of several kinds and makes a great contribution for development of a field for use of water-absorbent resin.

According to a production process in the present invention, a water-absorbent resin is easily obtained wherein, by adjusting viscosity of an aqueous solution of monomer, an average particle diameter can be controlled in an optional way although dependening upon the viscosity, distribution of particle diameters is narrow and the particle shape is sphere. Besides, in performing the process, by adjusting viscosity at a high or low level, a water-absorbent resin of sphere shape and a water-absorbent resin of non-sphere shape can be obtained optionally. Further, since the production process of the present invention wants to obtain a water-absorbent resin by an unique method wherein a sucrose fatty acid ester and/or a polyglycerol fatty acid ester being used as a dispersing agent and viscosity being adjusted at a value of more than 15 cps, a water-absorbent resin obtained shows that an amount of elution of a water-soluble component from the resin surface is only small. Also, an active agent remaining at the surface is of very high safety and suitable for use of, particularly, sanitary materials and the like.

If reverse-phase suspension polymerization, carried out according to the present invention, is followed by a drying process, a water-absorbent resin obtained can be taken out as a bead-like or Vienna sausage-like particle. As this drying process, there are methods wherein water is distilled off as an azeotropic mixture with a hydrophobic organic solvent used in polymerization and wherein filtration of a water-containing gel followed by drying with conventional drying apparatus due to heated wind, reduced pressure, or fluid bed is carried out.

DETAILED DESCRIPTION OF THE INVENTION

EXAMPLES

Although the present invention is explained in detail with the examples described below, a range of the present invention is not defined within the examples.

The water absorption performance of water-absorbent resin is determined according to the procedure shown below.

(1) Average particle Diameter and Distribution of Particle Diameter

The resin powder is sifted and classified by using JIS standard sieves (20, 32, 48, 60, 100, 145, 200, and 350 mesh) and then, the remaining percentage ( R % ) is plotted on a logarithmic probability paper. Average diameter is represented by a particle diameter corresponding to R for 50%.

The particle distribution is represented by using logarithmic standard deviation, $\sigma_\zeta$, as an index, which is derived from the following equation:

$$\sigma_\zeta = \tfrac{1}{2}\ln \frac{x_2}{x_1}$$

( $x_1$ and $x_2$ are particle diameters wherein $R$ are equal to 84.1% and 15.9%, respectively. )

Here, it is meaned that, as the value of $\sigma_\zeta$ becomes smaller, the particle distribution becomes more uniform.

(2) Water Absorption Capacity

The water-absorbent resin, 0.2 g, is uniformly put into a tea bag-like bag (40mm × 150mm) made by a nonwoven fabric, and soaked in a 0.9 weight % aqueous solution of sodium chloride. The teabag-like bag is taken out after 10 minutes and 30 minutes, respectively, and stood for draining for a designated time. Then, the weight is determined and the water absorption capacity is calculated by the following equation. Further, when only the tea bag being soaked, the weight obtained after water absorption is taken as a blank.

Water absorption capacity (g/g) =

(weight of bag after absorption − blank)/(weight of water-absorption resin)

(3) Water Absorption Rate

To 20 ml of synthetic urine containing 1.9 weight % of urea, 0.8 weight % of sodium chloride, 0.1 weight % of calcium chloride, and 0.1 weight % of magnesium sulfate is added 1.0 g of a water-absorbent resin. The water absorption rate is defined with time passed until the water-absorbent resin absorbing the synthetic urine losts the flowing character of a swelling gel.

(4) Suction force

Water-absorbent resin, 1.0 g, is placed on a material containing synthetic urine, prepared by adding 20 ml of synthetic urine on a tissue paper of size 55 mm × 75 mm. After standing for 10 minutes, a gel swelled is taken and weighed. The weight is defined as suction force of the resin from the tissue paper. At the same time, the presence of a fish-eye of the added water-absorbent resin was examined.

(5) Amount of Water-Soluble Component Eluted from Resin Surface

A disposable diaper for child composed of a nonwoven fabric, cotton-like pulp, a water-absorbent paper, and a waterproof film (having a weight of 72 g) is cut in half and 2.5 g of a polymer is uniformly scattered between the cotton-pulp and the water-absorbent paper and to this, 120 ml of the above-described synthetic urine is added, and the thus-prepared sample is stood for 16 hours at 37° C. After standing for 16 hours, the cotton-like pulp is only taken and a water-soluble component transferred from the pulp is extracted with 1,000 ml of pure water. This extract solution is filtered and a polymer component contained in this filtered solution is measured by using an acid-base titration method and thus, a total amount of a water-soluble component eluted is determined against the amount of water-absorbent resin as weight % .

EXAMPLE 1

In a four-necked separable 2 L flask equipped with a stirrer, a reflux condenser, a thermometer, an inlet tube for nitrogen gas, and a dropping funnel was placed 1,000 ml of cyclohexane and dissolved 4.0 g of a sucrose fatty acid ester (DK-ESTER F-50, HLB=6, a product from DAIICHI KOGYO SEIYAKU Co., LTD.) and nitrogen gas was introduced into this solution to remove oxygen dissolved. In another flask containing a solution of 84.6 g of sodium acrylate, 21.6 g of acrylic acid, and 0.016 g of N, N'-methylene-bisacrylamide in 197 g of ion-exchanged water was dissolved 0.53 g of hydroxyethylcellulose (HEC-DAISERU EP-850, a product from DAISERU CHEMICAL Co., LTD.) and was prepared a monomer solution adjusted at a monomer concentration of 35 weight % and viscosity of 40 cps. To this monomer solution was dissolved 0.15 g of potassium persulfate and then, nitrogen gas was introduced to remove oxygen dissolved in this aqueous solution.

Next, to the above separable flask solution was added the aqueous monomer solution in the latter flask and the mixture obtained was dispersed with stirring at 230 rpm. Then, polymerization reaction was initiated by raising bath temperature to 60° C. and completed by maintaining this temperature for 2 hours. After polymerization, the reaction mixture was treated by an azeotropic distillation with cyclohexane to remove water in the water-containing gel, filtered, and dried at 80° C. under reduced pressure to obtain a water-absorbent resin of sphere shape (A-1). Water content for this resin was 5.6%. The properties for this resin (A-1) are shown in table 1.

EXAMPLE 2

Except the use of 2.2 g of hydroxyethylcellulose (SP-600, a product from DAISERU CHEMICAL Co., LTD.), a polymerization reaction was carried out under the same conditions to those for example 1. Viscosity of the monomer aqueous solution was 800 cps and water content of a water-absorbent resin of sphere shape (A-2) was 6.8%. Results obtained from measurement of properties are shown in table 1.

EXAMPLE 3

Except the use of 3.5 g of hexaglycerol-condensed ricinolate (STEP RP-6, a product from KAO Co., LTD.), a polymerization reaction was carried out in the same way as in example 1 to obtain a water-absorbent resin of sphere shape (A-3), which showed water content of 6.3%. Results obtained from measurement of properties are shown in table 1.

EXAMPLE 4

In a four-necked separable 2 L flask equipped with a stirrer, a reflux condenser, a thermometer, an inlet tube for nitrogen gas, and a dropping funnel was placed 1,000 ml of cyclohexane and dissolved 4.0 g of a sucrose fatty acid ester (DK-ESTER F-20, a product from DAIICHI KOGYO SEIYAKU Co., LTD.), and nitrogen gas was introduced into this solution to expel oxygen dissolved. In another flask, 65.8 g of sodium acrylate, 21.6 g of acrylic acid, 0.076 g of polyethylene glycol diacylate (n=14), and 15 g of sodium polyacrylate (AQUALIC OM-100, a product from NIPPON SHOKUBAI KAGAKU KOGYO Co., LTD., viscosity of 150 cps at 25° C. for a 5% aqueous solution) was dissolved in 250 g of ion-exchanged water to prepare an aqueous monomer solution of viscosity of 20 cps.

Next, into this solution, 0.12 g of sodium persulfate was dissolved and a reaction procedure was carried out in the same way as that for example 1 to obtain a water-absorbent resin of sphere shape (A-4), which showed water content of 4.8%. Results obtained from measurement of properties are shown in table 1.

EXAMPLE 5

Except the use of sodium polyacrylate (AQUALIC FH, $2 \times 10^4$ cps at 25° C. for viscosity of 1% aqueous solution, a product from NIPPON SHOKUBAI KAGAKU KOGYO Co., LTD.) as a thickener, a reaction procedure was carried out in the same way as that for example 4 to obtain a water-absorbent resin of sphere shape (A-5), showing water content of 5.8%. The viscosity of an aqueous monomer solution was 27 cps. Results obtained from measurement of properties are shown in table 1.

EXAMPLE 6

Except that a monomer composition prepared by dissolving 68.7 g of sodium 2-acrylamido-2-methylpropanesulfonate, 7.05 g of sodium acrylate, and 1.8 g of acrylic acid in 181 g of ion-exchanged water and then, by dissolving 1.07 g of hydroxyethylcellulose (HEC-DAISERU-850, a product of DAISERU KAGAKU KOGYO Co., LTD.) was used, a reaction procedure was carried out in the same way as that for example 1 to obtain a water-absorbent resin of sphere shape (A-6), showing water content of 6.9%. The viscosity of an aqueous monomer solution was 280 cps. Results obtained from measurement of properties are shown in table 1.

EXAMPLE 7

Figure 1:
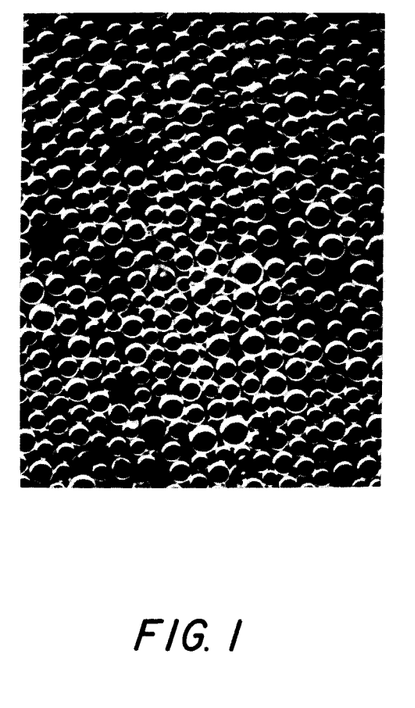
FIG. 1 is an optical microphotograph to represent a particle structure of the water-absorbent resin of a sphere shape (A-7) obtained from example 7.

Except that the amount of hydroxyethylcellulose (HEC-DAISERU EP-850, a product from DAISERU KAGAKU KOGYO Co., LTD.) in example 1 was changed into 1.6 g and the viscosity of aqueous monomer solution was adjusted at 2,000 cps, a polymerization reaction was carried out in the same way as that for example 1 to obtain a water-absorbent resin of all sphere shape (A-7), which showed water content of 6.4%. Properties for this resin are shown in table 1.

EXAMPLE 8

Except that the amount of hydroxyethylcellulose (HEC-DAISERU SP-600, a product from DAISERU KAGAKU KOGYO Co., LTD.) was 0.3 g and the viscosity of aqueous monomer solution was adjusted at 17 cps, a polymerization reaction was carried out in the same way as that for example 2 to obtain a water-absorbent resin of sphere shape (A-8) which showed water content of 5.9%. Properties for this resin are shown in table 1.

EXAMPLE FOR COMPARISON 1

Except the use of 3.5 g of sorbitan monostearate (REODOL SP-S10, a product of KAO Co., LTD.) instead of a sucrose fatty acid ester as a dispersing agent, a reaction procedure was carried out in the same way as that for example 1 to obtain a water-absorbent resin of sphere shape for comparison (B-1), showing water content of 6.2%. Results obtained from measurement of properties are shown in table 1.

EXAMPLE FOR COMPARISON 2

Figure 3:
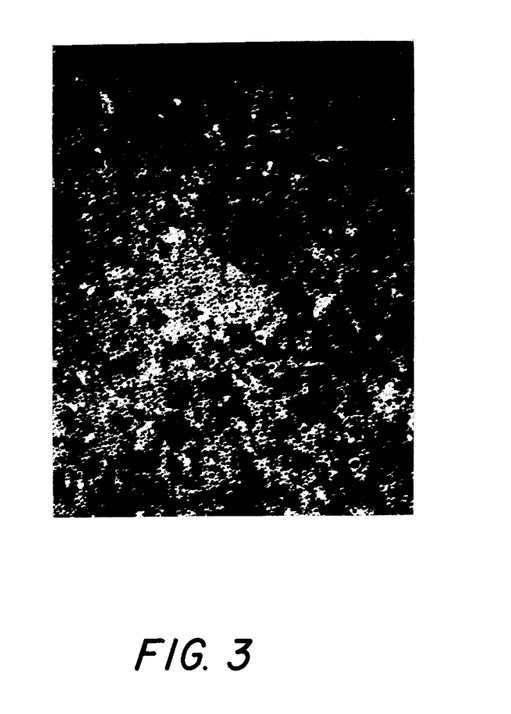
FIG. 3 is an optical microphotograph to represent a particle structure of the water-absorbent resin for comparison (B-2) obtained from example for comparison 2.

Except no addition of hydroxyethylcellulose to an aqueous monomer solution, a reaction procedure was carried out in the same way as that for example 1 to obtain a water-absorbent resin of sphere shape for comparison (B-2), showing water content of 4.7%. The viscosity of an aqueous monomer solution was 7 cps. Results obtained from measurement of properties are shown in table 1.

EXAMPLE FOR COMPARISON 3

Instead of a sucrose fatty acid ester in example 1, 4.0 g of hexaglycerol monostearate (POEMU J-4010, a product from RIKEN VITAMIN CO., LTD.) was used and hydroxyethylcellulose was not added to the aqueous monomer solution. Then, the same reaction procedure as that for example 1 was carried out to obtain a water-absorbent resin of sphere shape for comparison (B-3), showing water content of 5.9%. Results obtained from measurement of properties are shown in table 1.

TEST FOR MIXING PROPERTIES OF WATER-ABSORBENT RESIN WITH LIQUID

With 100 parts of each the water-absorbent resin (A-1)~(A-8), obtained from example 1~8, and the water-absorbent resin (B-1)~(B-3), obtained from example 1~3 was mixed a treatment solution composed of 0.3 parts by weight of diethylene glycol, 4 parts by weight of water, and 0.5 parts by weight of isopropanol by using a paddle-type blender. During blending, the water-absorbent resins for comparison (B-1)~(B-3) made fish-eyes due to ununiform dispersion of the treatment solution, but the water-absorbent resins (A-1)~(A-8) did not.

TABLE 1

| | Water-absorbent resin obtained | Average particle diameter ($\mu$m) | Particle diameter distribution $\sigma$ $\zeta$ | Water absorption capacity (g/g) 10 min. | 30 min. | Water absorption rate (sec.) | Suction force (g) | Formation of fish-eye * | Water-soluble component eluted (%) |
|---|---|---|---|---|---|---|---|---|---|
| Example 1 | Water-absorbent resin (A-1) | 400 | 0.16 | 44 | 62 | 65 | 13.2 | | 4.2 |

TABLE 1-continued

| | Water-absorbent resin obtained | Average particle diameter (μm) | Particle diameter distribution σ ζ | Water absorption capacity (g/g) 10 min. | 30 min. | Water absorption rate (sec.) | Suction force (g) | Formation of fish-eye * | Water-soluble component eluted (%) |
|---|---|---|---|---|---|---|---|---|---|
| Example 2 | Water-absorbent resin (A-2) | 500 | 0.11 | 41 | 58 | 95 | 13.5 | ○ | 3.9 |
| Example 3 | Water-absorbent resin (A-3) | 300 | 0.15 | 43 | 61 | 60 | 13.7 | ○ | 4.8 |
| Example 4 | Water-absorbent resin (A-4) | 350 | 0.18 | 46 | 65 | 62 | 12.8 | ○ | 4.6 |
| Example 5 | Water-absorbent resin (A-5) | 350 | 0.17 | 44 | 63 | 58 | 13.9 | ○ | 5.0 |
| Example 6 | Water-absorbent resin (A-6) | 450 | 0.20 | 40 | 57 | 67 | 12.7 | ○ | 4.3 |
| Example 7 | Water-absorbent resin (A-7) | 550 | 0.19 | 42 | 64 | 85 | 13.9 | ○ | 4.0 |
| Example 8 | Water-absorbent resin (A-8) | 150 | 0.24 | 41 | 60 | 61 | 12.3 | ○ | 4.4 |
| Example for comparison 1 | Water-absorbent resin for comparison (B-1) | 80 | 0.43 | 30 | 55 | 97 | 9.8 | × | 10.5 |
| Example for comparison 2 | Water-absorbent resin for comparison (B-2) | 100 | 0.41 | 31 | 57 | 120 | 9.0 | × | 9.8 |
| Example for comparison 3 | Water-absorbent resin for comparison (B-3) | 150 | 0.40 | 29 | 53 | 106 | 8.3 | × | 11.2 |

(Note)*
○: Nearly no formation of fish-eye
×: Some formation of fish-eye

As shown in table 1, it is understood that in the present invention, by taking such a simple operation as adjustment of viscosity, particles having a wanted avarage diameter fitted with a purpose and showing narrow distribution can be easily obtained. Also, due to uniformity of the particle diameter distribution, mixing character with an aqueous solution is excellent and one can carry out an improvement of the surface uniformly. Furthermore, even when contacting with water, it has superior water absorption rate and suction force, and it is seen that elution of a water-soluble component is small in amount. Furthermore, in a case of that surface improvement of the water-absorbent resin is carried out by mixing with a treatment solution containing water, the mixing character with the treatment solution is very good and the fish-eye is only formed with difficulty, so that the particle surface can be uniformly improved.

EXAMPLE 9

In a four-necked separable 2L flask equipped with a stirrer, a reflux condenser, a thermometer, an inlet tube for nitrogen gas, and a dropping funnel is placed 1,000 ml of cyclohexane and dissolved 4.0 g of a sucrose fatty acid ester (DK-ESTER F-50, a product from DAIICHI KOGYO SEIYAKU Co., LTD., HLP=6) and nitrogen gas was introduced into this solution to remove oxygen dissolved. In another flask containing a solution of 84.6 g of sodium acrylate, 21.6 g of acrylic acid, and 0.016 g of N,N'-methylene-bisacrylamide in 197 g of ion-exchanged water was dissolved 3.2 g of hydroxyethylcellulose (HEC-DAISERU EP-850, a product from DAISERU CHEMICAL Co., LTD.) and was prepared an aqueous monomer solution adjusted at a monomer concentration of 35 weight % and viscosity of 35,000 cps. To this aqueous monomer solution was dissolved 0.15 g of potassium persulfate and then, nitrogen gas was introduced to remove oxygen dissolving in this aqueous solution.

Figure 2:
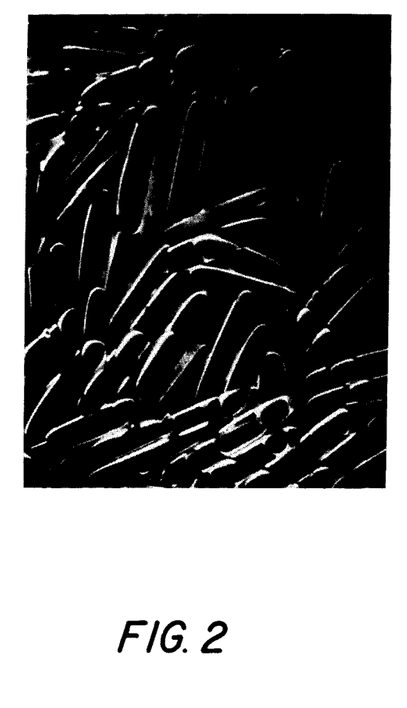
FIG. 2 is an optical microphotograph to represent a particle structure of the water-absorbent resin of a vienna sausage shape (C-1) obtained from example 9.

Next, to the above separable flask solution was added the aqueous monomer solution in the latter flask and the mixture obtained was dispersed with stirring at 230 rpm. Then, polymerization reaction was initiated by raising bath temperature to 60° C. and completed by maintaining this temperature for 2 hours. After polymerization completed, the reaction mixture was treated by an azeotropic distillation with cyclohexane to remove water in the water-containing gel, filtered, and dried at 80° C. under reduced pressure to obtain a water-absorbent resin (C-1), which had average length of 3,000 μm and average breadth of 550 μm and showed an angle-lacking, somewhat long and narrow shape of Vienna sausage type.

Besides, any sphere particle did not exist.

EXAMPLE 10

Except that the amount of a thickener, hydroxyethylcellulose (EP-850, a product of DAISERU KAGAKU KOGYO Co., LTD.) was changed into 5.3 g, a polymerization reaction was carried out in the same way as that for example 9. Viscosity of the aqueous monomer solution was 240,000 cps. After the polymerization completed, treatment with an azeotropic dehydration followed by filtration and drying under reduced pressure gave a water-absorbent resin (C-2) having average length of 3500 μm and average breadth of 600 μm and showing a long and narrow shape of Vienna sausage type. Any sphere particle did not exist.

EXAMPLE 11

Except that the amount of a thickener, hydroxyethylcellulose (EP-850, a product of DAISERU KAGAKU KOGYO Co., LTD.) was changed into 2.6 g, a polymerization reaction was carried out in the same way as that for example 9. Viscosity of the aqueous monomer solution was 16,000 cps. After the polymerization completed, treatment with an azeotropic dehydration followed by filtration and drying at 80° C. under reduced pressure gave a water-absorbent resin (C-3) having average length of 1500 μm and average breadth of 400 μm and showing a somewhat thick shape of Vienna sausage type. In this case, particles of sphere shape mixed together in an amount of about 40%.

EXAMPLE 12

Except that, as a dispersing agent, 5.5 g of a sucrose fatty acid ester (DK-ESTER F-20, HLB=2, a product from DAIICHI KOGYO SEIYAKU Co., LTD.) was used, a reaction procedure was carried out in the same way as that for example 9. The water-absorbent resin obtained (C-4) had average length of 2500 μm and average breadth of 450 μm and a Vienna sausage shape. None of particle of sphere shape exists.

EXAMPLE 13

As in the monomer composition of example 9, to 181 g of ion-exchanged water was dissolved 68.7 g of sodium 2-acrylamido-2-methylpropanesufonate, 7.05 g of sodium acrylate, and 1.8 g of acrylic acid and then, was dissolved 2.7 g of hydroxyethylcellulose (HEC-DAISERU EP-850, a product from DAISERU KAGAKU KOGYO Co., LTD.). Except that the solution thus-prepared was used, a reaction procedure was carried out in the same way as that for example 9 to obtain a water-absorbent resin (C-5) having average length of 1500 μm and average breadth of 400 μm and showing a somewhat thick shape of Vienna sausage type. Viscosity of the aqueous monomer solution was 50,000 cps. None of particle of sphere shape exists.

EXAMPLE FOR COMPARISON 4

Except that, as a dispersing agent, 3.5 g of sorbitan monostearate (REODOL SP-S10, a product of KAO Co., LTD.) was used instead of a sucrose fatty acid ester, a reaction procedure was carried out in the same way as that for example 9 to obtain a water-absorbent resin for comparison (D-1), all of which showed a sphere shape.

EXAMPLE FOR COMPARISON 5

Figure 4:
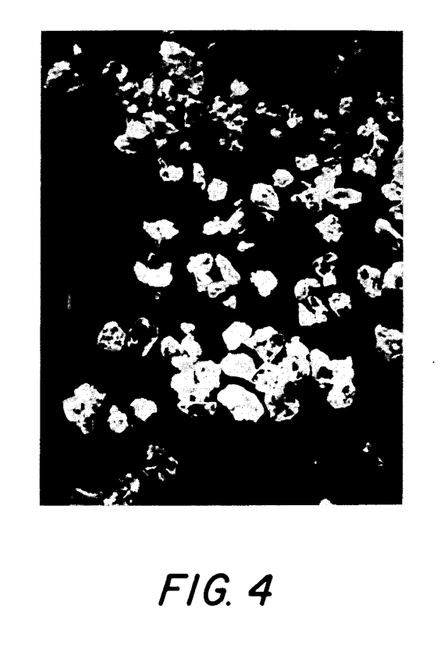
FIG. 4 is an optical microphotograph to represent a particle structure of the water-absorbent resin for comparison (D-2) obtained from example for comparison 5.

Into 329 g of ion-exchanged water was dissolved 141 g of sodium acrylate, 36.1 g of acrylic acid, and 0.118 g of N,N'-methylen-bisacrylamide and, a static aqueous solution polymerization was carried out by using 0.68 g of ammonium persulfate and 0.025 g of sodium hydrogensulfite to obtain a gel-like water-containing polymer, which was dried at 180° C. with a heated wind dryer, pulverized with a hammer-type pulverizer, and sieved with a 28 mesh metal net. A water-absorbent resin for comparison (D-2) was thus obtained in a pulverized shape.

TEST FOR HANDLING PROPERTIES OF WATER-ABSORBENT RESIN

Test 1

Water-absorbent resins, each 2.5 g, obtained from examples 9~13 and example for comparison 2, 4, and 5 were uniformly spread in a range of 18 cm × 13 cm in a center part of an absorption paper of size 20 cm × 15 cm and subjected to vibration under a constant condition by using a vibrator, and amounts of polymer fallen off from the absorption paper were determined. Results are summarized in table 2.

TEST 2

In the same way as test 1, water-absorbent resins, each 2.5 g, obtained from examples 9~13 and examples for comparison 2, 4, and 5 were uniformly spread on an absorption paper, upon which the same absorption paper was put, upon which a 4 mesh metal net was further placed. Pressing treatment was carried out by using a roller under an identical condition and an appearance of the absorption paper for a water-absorbent resin was observed. Results obtained are summarized in table 2.

TEST 3

Water-absorbent resins obtained from examples 9~13 and examples 2, 4, and 5 were uniformly spread on a cotton-like pulp sheet of 20 cm × 15 cm, upon which the same cotton-like pulp sheet was put, upon which a 4 mesh metal net was further placed. Pressing treatment was carried out by using a roller under an identical condition. Then, an absorption body was held at both terminal position with both the hands and waved up and down three times. The amount of a polymer fallen off was measured. Results are summarized in table 2.

TABLE 2

| | | Polymer fallen off from absorption paper (g) | Appearance of absorption paper | Polymer fallen off from absorbent pulp body (g) |
|---|---|---|---|---|
| Water-absorbent resin | (C-1) | 0.08 | no change | 0 |
| Water-absorbent resin | (C-2) | 0.03 | no change | 0 |
| Water-absorbent resin | (C-3) | 0.43 | no change | 0.12 |
| Water-absorbent resin | (C-4) | 0 | no change | 0 |
| Water-absorbent resin | (C-5) | 0.04 | no change | 0 |
| Water-absorbent resin for comparison | (B-2) | 2.05 | no change | 0.73 |
| Water-absorbent resin for comparison | (D-1) | 1.68 | no change | 0.87 |
| Water-absorbent resin for comparison | (D-2) | 0.88 | Partial breakdown with polymer-falling off | 0.33 |

As shown clearly in table 2, the water-absorbent resin of angle-lacking and stick-like shape in the present invention, in comparison with a water-absorbent resin of sphere shape, is superior in handling properties. Since it is easy to use in combination with other materials etc. and shows that an amount of falling off from a basis materials is small, the present resin greatly contributes for development of a field for use of water-absorbent resins.

We claim:

1. A process for producing water-absorbent resins wherein an aqueous solution of water-soluble ethylenically unsaturated monomer having a viscosity of 15 cps or more, determined by a Brookfield rotational viscometer (25° C., 0.6 rpm), with using a sucrose fatty acid ester and/or a polyglycerol fatty acid ester as a dispersing agent, being dispersed and suspended in a inert hydrophobic organic solvent and polymerized by an initiator for radical polymerization.

2. A process for producing water-absorbent resins as claimed in claim 1, wherein viscosity of an aqueous solution of water-soluble ethylenically unsaturated monomer being adjusted in a range of 15~5,000 cps.

3. A process for producing water-absorbent resins as claimed in claim 1, wherein viscosity of an aqueous solution of water-soluble ethylenically unsaturated monomer being adjusted in a range of 5,000~1,000,000 cps and a sucrose fatty acid ester being only used.

* * * * *